UNITED STATES PATENT OFFICE 2,689,260

CATALYTIC DEHYDRATION PROCESS

George Karmas, Plainfield, N. J., assignor to Ortho Pharmaceutical Corporation, a corporation of New Jersey No Drawing. Application August 7, 1951, Serial No. 240,801

The portion of the term of the patent subsequent to November 13, 1968, has been disclaimed 5 Claims. (Cl. 260—491)

This invention relates to the dehydration of tertiary allylic alcohols and more specifically this invention relates to the dehydration of tertiary allylic alcohols by their reaction with an excess of an isocyanate in the presence of a catalyst.

Heretofore catalysts have been used to promote the formation of urethanes by the reaction of an alcohol or phenol with an isocyanate, and this reaction resulted in the formation of a stable urethane which was not readily decomposed to produce a dehydration product of the alcohol.

In a copending application, Serial No. 657,913, filed March 28, 1946, by William Oroshnik, and now abandoned, it is disclosed that an isocyanate and particularly phenylisocyanate may be used to dehydrate a tertiary allylic alcohol having the following formula:

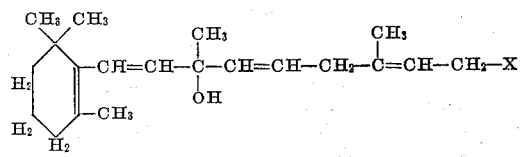

Compound II in which X is —OR or

and R is a hydrocarbon radical. This application discloses that the dehydration can be accomplished without the use of a catalyst. Dehydration with an isocyanate and without a catalyst requires considerable time and the yields of dehydrated product vary but are never high; the uncatalyzed dehydrations are unpredictable bacause the same reactants do not always result in identical reaction products.

An object of this invention is to dehydrate tertiary allylic alcohols by a catalyzed reaction.

Another object of this invention is to dehydrate tertiary allylic alcohols by a reaction of the said alcohols with an isocyanate in the presence of a catalyst.

Still another object of this invention is to dehydrate tertiary allylic alcohols by a reaction of the said alcohols with at least twice their molar amount of an isocyanate in the presence of a catalyst.

Other and further objects of this invention will be apparent from the description following and from the appended claims.

It has now been discovered that a dehydration product of a tertiary allylic alcohol is consistently obtained in good yields by reacting an isocyanate, in the presence of a catalyst, with the said alcohol, wherein an excess of isocyanate is used and preferably wherein the amount of the isocyanate used in the reaction is equal to at least twice the molar amount of the tertiary alcohol. This catalytic dehydration reaction is rapidly completed in a reproducible manner due to the use of the catalyst in the reaction.

The following equations probably represent the course of the reaction whereby a tertiary allylic alcohol is dehydrated by a reaction with an isocyanate in the presence of a catalyst:

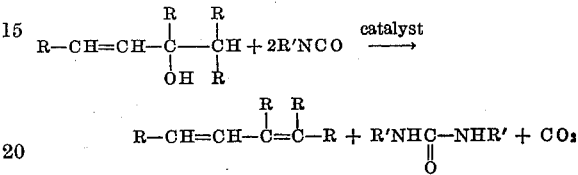

wherein the R groups may be any hydrocarbon radical or hydrogen or any substituted hydrocarbon radical in which the substituent group is not reactive with an isocyanate radical and wherein R' may be any hydrocarbon radical or substituted hydrocarbon radical in which the substituent group is not reactive with an isocyanate radical.

The dehydration reaction probably includes the formation of a urethane as an intermediate reaction product having the following formula:

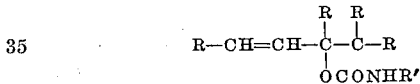

This intermediate reaction product represents the reaction of one molecule of isocyanate with the alcohol; the dehydration of the alcohol is accomplished by the reaction of the above urethane with a second molecule of isocyanate. Carbon dioxide and a substituted urea are byproducts of the dehydration reaction.

The dehydration reaction is catalyzed by anhydrous inorganic or anhydrous organic salts of heavy metals and particularly by such salts of metals of group II of the periodic table and by anhydrous inorganic and organic ferric salts and particularly by ferric halides and halides of metals of group II. Halides which have been found especially suitable as catalysts are ferric chloride and cadmium iodide; ferric thiocyanate and organic ferric salt such as the ferric salt of acetylacetone have also been found to give particularly good results in the catalytic dehydration.

The ferric salt of acetylacetone is a chelate compound. Chelate compounds of ferric iron with beta-diketones and beta-ketoesters are in general good catalysts for the dehydration reaction. Ferric salts of organic acids such as benzoic acid, phthalic acid and acetic acid; ferric salts of sulfonic acids such as benzene sulfonic acid; and ferric salts of phenolic compounds such as phenol and cresol are also good catalysts for the dehydration reaction.

This invention has been found to have particular application in the dehydration of a divinyl carbinol of the following general formula:

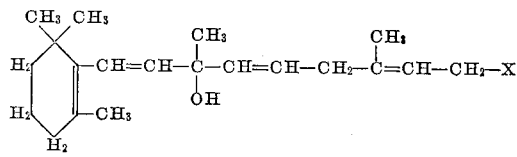

*Compound II* wherein X represents the groups —OR or

and R is a hydrocarbon radical. The preparation of compounds of the type of Compound II was described in a publication in the Journal of the American Chemical Society, volume 67, page 1627 (1945). In this publication it was disclosed by William Oroshnik that derivatives of α-ethynyl-β-ionol have value as intermediates in the preparation of synthetic compounds having vitamin A activity. According to this publication a compound having the following formula

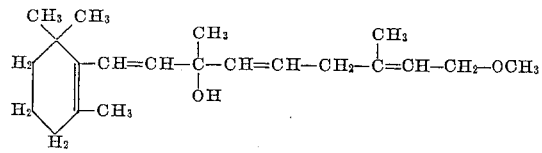

*Compound II (methoxy)* was prepared by catalytic reduction of an acetylenic compound prepared by reacting α-ethynyl-β-ionol with a Grignard reagent and an ether of a 1,4-chlorohydrin of isoprene according to the following equation:

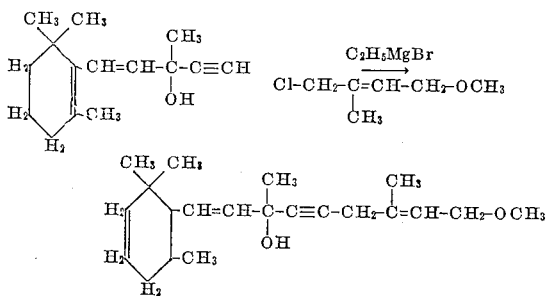

*Compound I (methoxy)*

The reduction product of the acetylenic compound could be converted to a compound having vitamin A activity by a simultaneous dehydration and rearrangement; this was accomplished at room temperature in glacial acetic acid in the presence of a trace of p-toluene sulfonic acid. By this method a rearrangement occurred simultaneously with the dehydration and an intermediate dehydration product could not be isolated, but compounds having vitamin A activity were produced.

The dehydration of compounds such as Compound II may be accomplished by the practice of this invention with the production of a stable product having five double bonds and the same configuration with respect to carbon structure as vitamin A, and thus the dehydration product then has the same number of ethylenic linkages as an ester or ether of vitamin A which has the following formula:

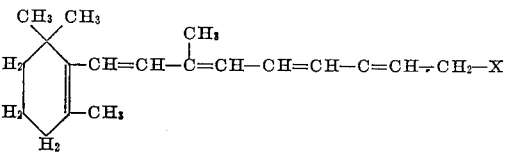

in which X is —OR or

and R is a hydrocarbon radical.

The preparation of compounds having the general formula:

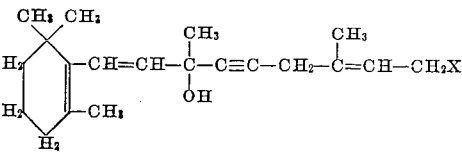

*Compound I* in which X is —OR or

and in which R is a hydrocarbon radical and the hydrogenation of such compounds to produce Compound II is described in a copending application, Serial No. 617,666, filed September 20, 1945, by William Oroshnik, and now abandoned. The following are illustrative methods of the various methods which may be employed for producing Compounds I and II.

β-Ionone may be reacted with calcium acetylide as described in a copending application, Serial No. 615,691, filed September 11, 1945, by William Oroshnik, now Patent No. 2,425,201 or with lithium acetylide as set forth in another copending application, Serial No. 655,607, filed March 19, 1946, by William Oroshnik, now Patent No. 2,472,310 to produce α-ethynyl-β-ionol. The α-ethynyl-β-ionol produced may be reacted with a metal hydrocarbon or a hydrocarbon metal halide; the hydrocarbon metal halide used is preferably the Grignard reagent. This reaction produces, in the preferred form, a double Grignard of α-ethynyl-β-ionol, as described in a copending application, Serial No. 657,912, filed March 28, 1946, by William Oroshnik, and now abandoned. The general formula below represents the derivative of α-ethynyl-β-ionol produced by the reaction:

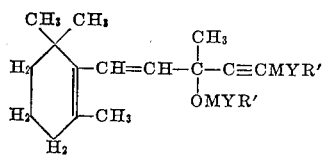

in which M is a metal having a valence not greater than two, Y is a halogen and R' is a hydrocarbon radical; but when M is a metal having a valence of one, Y and R' are non-existent; when M is a metal having a valence of two and Y is a halogen, R' is non-existent; and when M is a metal having a valence of two and R' is a hydrocarbon radical, Y is non-existent. In the preferred practice MY is MgBr and R' is nonexistent. Among some of the illustrative compounds which may be reacted with α-ethynyl-β-ionol to produce compounds of the aforesaid formula are diethyl magnesium, ethyl magnesium bromide, methyl lithium, methyl zinc iodide, and butyl lithium. These reagents may be represented by the general formula $(R')_xMY$, in which R' is a hydrocarbon radical, such as methyl-, ethyl-, benzyl-, and the like, $x$ is an integer not greater than two, M is a metal having a valence not greater than two, and Y is a halogen if $x$ is one and the valence of the metal is two, but Y is non-existent if M is a metal having a valence of one and $x$ is one or if M is a metal having a valence of two and $x$ is two.

The compounds represented by the last general formula shown may be reacted with an ester or with an ether of a 1,4-halohydrin of isoprene having the following general formula:

$$Z-CH_2-\underset{\underset{CH_3}{|}}{C}=CH-CH_2X$$

in which X is —OR or

and R is a hydrocarbon radical and Z is a halogen.

A compound is produced by this reaction which has the following general formula:

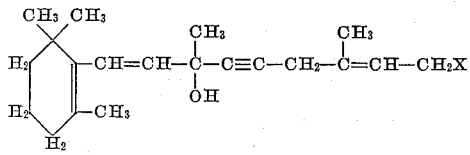

*Compound I* in which X has the same meaning as before.

The methods for producing the ester and ether of the 1,4-halohydrin of isoprene are described in the copending applications, Serial No. 633,873, filed December 8, 1945, by William Oroshnik, now Patent No. 2,541,091 and Serial No. 633,874, filed December 8, 1945, by William Oroshnik, now Patent No. 2,511,870.

Compound I may be prepared in other ways. One such method of preparing Compound I is to react the ester or ether of the 1,4-halohydrin of isoprene with an acetylide such as sodium, potassium, lithium, or calcium acetylide to produce a compound having the formula:

$$HC\equiv C-CH_2-\underset{\underset{CH_3}{|}}{C}=CH-CH_2X$$

in which X has the same significance as before. This compound may then be treated with a hydrocarbon metallic halide such as alkyl magnesium halide to produce a compound having the general formula $$YM-C=C-CH_2-\underset{\underset{CH_3}{|}}{C}=CH-CH_2X$$

in which X has the same significance as above, M is a metal, and Y is a halogen.

Compound I is produced by reacting this compound with β-ionone.

Compound I may have its acetylenic bond converted to an ethylenic bond by hydrogenation whereby Compound I is converted to Compound II which has four ethylenic linkages and a hydroxyl group, which hydroxyl group is potentially capable of producing a fifth ethylenic linkage by being removed as water.

The following illustrative material illustrates the reactions leading up to and the preparation of Compound II in which X is —OR and R is methyl and in which X is

and R is methyl.

Preparation of the double Grignard of α-ethynyl-β-ionol.

One mole proportion (218 grams) of α-ethynyl-β-ionol is placed in a glass flask. Then about 600 grams of anhydrous ethyl ether, which dissolves α-ethynyl-β-ionol, are added. This solution is continuously agitated or stirred while two mole proportions of a Grignard reagent, and in this example 267 grams of $C_2H_5MgBr$ dissolved in 700 cc. of anhydrous ethyl ether, are gradually added. After completion of this addition, the mixture is heated to boiling while being continuously stirred and in constant state of agitation and is maintained in this state of boiling under a reflux condenser for a period of approximately thirty minutes to produce a novel reaction product which is dissolved in the ethyl ether and which has the following formula:

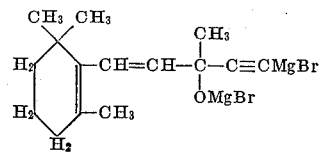

Condensation of α-ethynyl-β-ionol double Grignard with 1-chloro-2-methyl-4-methoxy-butene-2 to form (Compound II—methoxy).

To the reaction mixture containing the double Grignard in ether solution, and which has been allowed to cool to room temperature, is added one mole proportion of the methyl ether of the 1,4-chlorohydrin of isoprene followed by the addition of approximately two grams of cupric chloride as a catalyst. The mixture is stirred under a reflux condenser, and heated to boiling, kept at a boiling temperature under reflux for two to four hours, then allowed to cool to room temperature, and finally stirred for fifteen hours. At this point two layers are formed.

Cuprous bromide may also be used to catalyze the condensation. When cupric chloride is used, a series of color changes from dark red to yellow occur within the first few minutes, but when cuprous bromide is used, there are no color changes, but a gradual solution of the solid takes place. After approximately three-fourths of an hour a heavy lower liquid layer is formed. The refluxing with stirring is continued at room temperature for fifteen hours in either case. By this time the lower liquid layer has changed to a tacky reddish mass.

Hydrolysis and purification of the reaction product containing Compound I (methoxy).

The reaction product containing Compound I (methoxy) is hydrolyzed by first chilling to —40° C., and then 1500 cc. of 30% aqueous ammonium chloride is added slowly and cautiously to the chilled material. The reaction mixture is allowed to come up slowly to room temperature with stirring and is then stirred until all solid matter has dissolved.

The hydrolysis may be made with aqueous acetic acid, in which case the reaction product is cooled to —10° C. This temperature is maintained for an additional fifteen minutes after addition of the acetic acid is complete. In either case the mass is allowed to come to room temperature and is filtered. The filtrate separates into two layers, an aqueous layer and an ether layer. The ether layer is separated from the aqueous layer and washed with water and then with sodium bicarbonate solution, to neutralize any residual acetic acid.

A 5% aqueous solution of ammonium acetate may also be used to hydrolyze the reaction product by following the same conditions as when aqueous acetic acid is used.

The neutral reaction product obtained by the hydrolysis is treated to remove therefrom any unreacted methyl ether of the 1,4-chlorohydrin of isoprene which may be present. This may be done by first concentrating the neutralized ether solution of the reaction mass under vacuum and at room temperature and then dissolving the resulting concentrate in about five times its volume of diethylamine or ethyl alcohol and diethylamine and allowing this solution to stand at room temperature for eight to twenty-four hours. This solution is then poured into a large volume of water whereupon liquid oily particles separate out and are extracted with ethyl ether which dissolves the oily material. This ether solution is separated and removed from the aqueous portion of the mix and is then washed with water, with a 5% aqueous solution of acetic acid, with water again, and finally with an aqueous solution of sodium bicarbonate. A small amount of diethylamine is added to the resultant ether solution, and the solution is dried with anhydrous potassium carbonate or other suitable drying agent and is filtered; the filtrate is recovered and concentrated under vacuum at room temperature. This concentrate consists essentially of Compound I (methoxy) and is distilled under high vacuum. The major portion is distilled at 115–125° C. at $10^{-3}$ mm. and has an index of refraction at 27° C. of 1.5194.

Reduction of Compound I (methoxy) to produce Compound II (methoxy).

Compound I (methoxy) is dissolved in five to ten times its volume of anhydrous methanol containing 0.07 gram of zinc acetate and 10 cc. of diethylamine per 150 cc. of methanol. To this solution is then added 10 grams of powdered activated charcoal "Norite" containing one gram of palladium metal uniformly distributed on its surface. This mixture is shaken to thoroughly mix the components and is then shaken under an atmosphere of hydrogen gas at atmospheric pressure. A small amount of hydrogen is absorbed in this step. To this mixture is added thirty grams of calcium carbonate powder containing 0.36 gram of palladium hydroxide uniformly distributed on its surface, and this mixture is again subjected to shaking in an atmosphere of hydrogen at atmospheric pressure. Absorption of hydrogen proceeds rapidly under these conditions. The quantity of hydrogen is measured continuously, as it is being added, by any convenient means. When one mole of hydrogen has been absorbed, this operation is stopped, and the mass is filtered and the filtrate is recovered and consists essentially of a novel compound dissolved in methanol and having the following general formula:

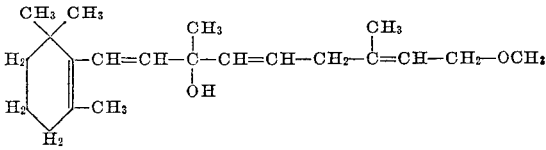

*Compound II (methoxy)*

This methanol solution is poured into a large volume of water which dissolves the methanol and separates the oil therefrom. To this mass is added ethyl ether which dissolves the oil. A separation into two layers, an ether layer and an aqueous layer, results. The ether layer is separated from the aqueous layer and is then washed several times with water; it is dried with potassium carbonate or any other suitable drying agent, filtered, and the filtrate is recovered and concentrated under vacuum at room temperature. The concentrate is then subjected to high vacuum distillation, preferably at a pressure of .001 or .0001 mm. of mercury pressure, and three fractions are usually separated and collected. One fraction distills at 60–100° C. at a pressure of 0.001 mm. of mercury and measures about twenty-five grams; a second fraction distills at 100–115° C. at a pressure of 0.001 mm. of mercury and measures about ten grams; and a third fraction which distills at 115–118° C. at a pressure of 0.001 mm. of mercury and measures 260 grams. This third fraction has carbon and hydrogen values corresponding to the calculated values of a compound having the formula of Compound II (methoxy). This third fraction is a golden viscous liquid which shows slight absorption of ultra violet light and has an index of refraction at 26° C. of 1.5099.

Reaction of 1-chloro-2-methyl-4-acetoxy-butene-2 with the double Grignard of α-ethynyl-β-ionol to produce Compound I (acetoxy).

Two grams of cuprous bromide were added to the double Grignard of α-ethynyl-β-ionol, which had been prepared by adding 132 cc. of a 1.585 molar solution of ethyl magnesium bromide in ether to 21.8 grams of α-ethynyl-β-ionol in 50 cc. of dry ether. The black color of the solution disappeared immediately after the cuprous bromide had been added, and the color of the solution was then light yellow. Eighteen grams of the acetoxy compound, in 20 cc. of ether, were added to the above solution of the double Grignard of α-ethynyl-β-ionol over a period of about ten minutes and within a very short time after the addition was complete a second heavy layer appeared. The solution was stirred under nitrogen for eighteen hours and was then cooled to —20° C. A saturated solution of ammonium chloride was carefully added, and the solution was then allowed to come up to room temperature. The solution was filtered, washed with water, then alternately with ether and ammonium chloride solutions several times. The solution was again filtered and the ether layer was concentrated under vacuum. The residual oil was dissolved in 50 cc. of 95% ethyl alcohol and 50 cc. of diethyl ethanolamine. The solution was allowed to stand at room temperature for a period of two days under nitrogen and in the dark. The dark opaque reaction mixture was poured into several times its volume of brine solution and was extracted with petroleum ether. The petroleum ether layer was washed with dilute acetic acid and then with water and finally with sodium bicarbonate solution. The solution was dried over potassium carbonate and concentrated under vacuum; it was not purified further. The product of this reaction has the following formula:

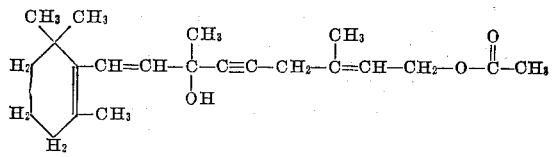

*Compound I (acetoxy)*

Reduction of Compound I (acetoxy) to produce Compound II (acetoxy).

The concentrate from the above reaction was dissolved in 150 cc. of methyl alcohol containing two grams of acetic anhydride. As a catalyst, one gram of catalytic material consisting of palladium or charcoal wherein 10% of the composition was palladium, 2 cc. of water and 10 cc. of diethylamine were added to the concentrate. The concentrate plus the catalyst mixture were shaken in the presence of hydrogen until an amount of hydrogen slightly in excess of the theoretical amount required to reduce an acetylenic bond to an ethylenic bond had been absorbed. The catalyst was then filtered off, and the resulting filtrate was poured into brine. This mixture was extracted several times with ether, washed well with water, and the ether solution was dried over potassium carbonate. The ether solution was filtered, concentrated under vacuum, and finally distilled at $10^{-3}$ mm. Three fractions were taken. The first fraction came over at 60–105° and had a refractive index of $n_D^{27.7}=1.5128$; the second fraction came over at 105–110° and had a refractive index of $n_D^{27.7}=1.5278$ and the third fraction came over at 110–150° and had a refractive index of $n_D^{27.7}=1.5390$. The third fraction represents the reduced product and has the following formula:

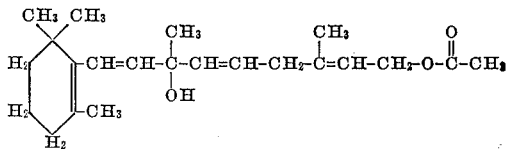

*Compound II (acetoxy)*

The following exemplary material is given in order to illustrate the practice of the invention in one of its specific embodiments, and it is not intended that the examples are to be construed in a limiting sense.

EXAMPLE I

*Catalytic dehydration of Compound II (methoxy)*

Ten grams of distilled Compound II (methoxy), dissolved in 100 cc. of dry benzene, were added to 20 cc. of phenylisocyanate and 3 mg. of the anhydrous ferric salt of acetylacetone were added to the mixture and the whole was refluxed for two hours. The benzene and any excess, unreacted isocyanate were distilled off under vacuum. The residual pasty mass was extracted with two 100 cc. portions of petroleum ether, boiling at 30–60° C., and the petroleum ether solution was filtered to remove any insoluble diphenylurea. The petroleum ether filtrate was washed with water and dried over anhydrous potassium carbonate. The petroleum ether was distilled under high vacuum, and the residue was distilled. The major portion distilled at 105–115° C. at $10^{-3}$ mm. and had an index of refraction at 25° C. of 1.575.

EXAMPLE II

*Catalytic dehydration of Compound II (acetoxy)*

Ten grams of distilled Compound II (acetoxy) dissolved in 100 cc. of dry benzene, were added to 20 cc. of phenylisocyanate, followed by the addition of 3 mg. of the anhydrous ferric salt of the ethyl ester of acetoacetic acid. This mixture was refluxed for two hours. The benzene and excess of phenylisocyanate were distilled off under vacuum and the residual pasty mass was extracted with two 100 cc. portions of petroleum ether, boiling at 30–60° C. and filtered to remove any insoluble diphenylurea. The petroleum ether filtrate was washed with water and dried over anhydrous potassium carbonate. The petroleum ether was distilled and the residue was subjected to distillation under high vacuum; the distillate was contaminated with diphenylurea. The crude product was dissolved in 50 cc. of petroleum ether and again filtered from insoluble diphenylurea. The petroleum ether was removed by distillation and the residue was distilled under high vacuum. A distillate boiling at 105–120° C. at $10^{-3}$ mm. was obtained which was free from diphenylurea and which had a refractive index of $n_D^{24}=1.5692$.

The yield of distilled product was 4.5 grams.

This application is a continuation-in-part of my U. S. application Serial No. 767,849, filed August 9, 1947, now U. S. Patent No. 2,574,484.

What is claimed is:

1. A process for dehydrating a compound having the following general formula:

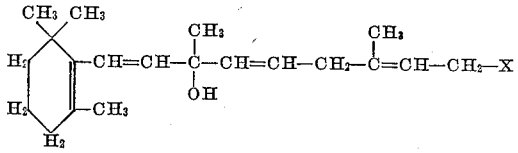

wherein X is selected from the group consisting of —OR and

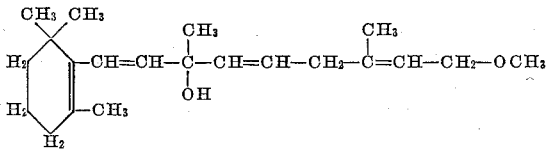

and R is a hydrocarbon radical; which comprises reacting the said compound with phenyl isocyanate in the presence of a catalyst selected from the group consisting of anhydrous chelate compounds of ferric iron with beta-diketones, anhydrous chelate compounds of ferric iron with beta-ketoesters, anhydrous ferric salts of organic carboxylic acids, anhydrous ferric salts of organic sulfonic acids, and anhydrous ferric salts of phenolic compounds.

2. A process for dehydrating a compound having the following formula:

which comprises reacting the said compound with phenyl isocyanate in the presence of a catalyst selected from the group consisting of anhydrous chelate compounds of ferric iron with beta-diketones, anhydrous chelate compounds of ferric iron with beta-ketoesters, anhydrous ferric salts of organic carboxylic acids, anhydrous ferric salts of organic sulfonic acids, and anhydrous ferric salts of phenolic compounds.

3. A process for dehydrating a compound with the following formula:

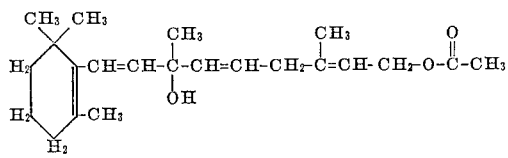

which comprises reacting the said compound with phenyl isocyanate in the presence of a catalyst selected from the group consisting of anhydrous chelate compounds of ferric iron with beta-diketones, anhydrous chelate compounds of ferric iron with keta-ketoesters, anhydrous ferric salts of organic carboxylic acids, anhydrous ferric salts of organic sulfonic acids, and anhydrous ferric salts of phenolic compounds.

4. A process according to claim 1 in which the catalyst is the anhydrous ferric salt of acetylacetone.

5. A process according to claim 1 in which the catalyst is the anhydrous ferric salt of the ethyl ester of acetoacetic acid.

References Cited in the file of this patent

UNITED STATES PATENTS

| Number | Name | Date |
|---|---|---|
| 2,540,118 | Isler | Feb. 16, 1951 |
| 2,574,484 | Karmas | Nov. 13, 1951 |